US005774243A

United States Patent [19]
Majima

[11] Patent Number: 5,774,243
[45] Date of Patent: Jun. 30, 1998

[54] CONTROL METHOD OF SELECTING WAVELENGTH OF OPTICAL FILTER, WAVELENGTH CONTROL METHOD OF OUTPUT LIGHT FROM LIGHT OUTPUTTING APPARATUS, WAVELENGTH DIVISION MULTIPLEXING METHOD IN OPTICAL COMMUNICATION SYSTEM AND METHOD FOR CORRECTING RELATION BETWEEN CONTROL

[75] Inventor: Masao Majima, Isehara, Japan

[73] Assignee: Canon Kabushiki Kaisha, Tokyo, Japan

[21] Appl. No.: 725,399

[22] Filed: Oct. 3, 1996

[30] Foreign Application Priority Data

Oct. 5, 1995 [JP] Japan ..................................... 7-258647
Sep. 30, 1996 [JP] Japan ..................................... 8-258610

[51] Int. Cl.[6] .................................................. H04B 10/06
[52] U.S. Cl. ........................... 359/124; 359/127; 359/193; 359/189
[58] Field of Search .................................... 359/124, 125, 359/133, 113, 189, 194, 195, 127

[56] References Cited

U.S. PATENT DOCUMENTS

| | | | |
|---|---|---|---|
| 5,315,425 | 5/1994 | Van Deventer et al. | 359/124 |
| 5,469,288 | 11/1995 | Onaka et al. | 359/124 |
| 5,491,577 | 2/1996 | Gautheron et al. | 359/194 |
| 5,552,919 | 9/1996 | Majima et al. | 359/161 |
| 5,594,577 | 1/1997 | Majima et al. | 359/124 |

OTHER PUBLICATIONS

Miller, C.M. "A Field–Worthy, High–Performance, Tunable Fiber Fabry–Perot Filter", ECOC '90–605, pp. 605–608 (1990).

Kotaki, Y., et al., "Long Cavity λ/4 Shifted MQW–DFB Laser with Three Electrodes," Institute of Electronics, Information and Communication Engineers (IEICE), QQE 89–116, vol. 89, No. 329, pp. 60–66 (Dec. 1989).

*Primary Examiner*—Leslie Pascal
*Attorney, Agent, or Firm*—Fitzpatrick, Cella, Harper & Scinto

[57] ABSTRACT

Disclosed in this application is a method for correcting the relation between a control signal for controlling a selecting wavelength of an optical filter and the selecting wavelength of the optical filter. In the present invention, the selecting wavelength of the optical filter is swept in a wavelength range comprising wavelengths of light of first and second wavelengths generated by optical frequency modulation, and the above correction is carried out based on a difference between values of the control signal when the light of the first and second wavelengths is selected. A wavelength difference is normally controlled with high accuracy between light of two wavelengths generated by optical frequency modulation, and the present invention thus involves performing the above correction based on the wavelength gap controlled with high accuracy.

24 Claims, 9 Drawing Sheets

OPERATION 1
LD: LIGHT-EMISSION AT SHORTEST WAVELENGTH
OPTICAL FILTER: SWEEP FROM Vfmin TO Vfm2+dVfc+Vfm OPERATION 2
OPTICAL FILTER: SWEEP FROM Vfm1−Vfm TO Vfm2+dVfc+Vfm
(1) LD: SHIFT TO LONGER WAVELENGTH SIDE (2) LD: KEEP DIFFERENCE OF WAVELENGTH BETWEEN λ4m AND λ3s AT dλc OPERATION 1
  LD : LIGHT-EMISSION AT SHORTEST WAVELENGTH
  OPTICAL FILTER : SWEEP FROM Vfmin TO Vfm2 + dVft + Vfm OPERATION 2
  LD : SHIFT TO LONGER WAVELENGTH SIDE
  OPTICAL FILTER : SWEEP FROM Vfm1 − Vfm TO Vfm1 + dVft + Vfm OPERATION 3
  LD : KEEP DIFFERENCE OF WAVELENGTH BETWEEN λ4m AND λs3 AT dλc
  OPTICAL FILTER : SWEEP FROM Vfm1 + Vfm TO Vfm2 − dVfc − Vfm OPERATION 1
  LD : LIGHT-EMISSION AT SHORTEST WAVELENGTH
  OPTICAL FILTER : SWEEP FROM Vfmin TO Vfm2 + dVfc + Vfm OPERATION 2
  OPTICAL FILTER : SWEEP FROM Vfm1 − Vfm TO Vfm1
    + dVfc + Vfm
  (1) LD : SHIFT TO LONGER WAVELENGTH SIDE (2) LD : KEEP DIFFERENCE OF WAVELENGTH BETWEEN
      λm AND λ3s AT dλc

CONTROL METHOD OF SELECTING WAVELENGTH OF OPTICAL FILTER, WAVELENGTH CONTROL METHOD OF OUTPUT LIGHT FROM LIGHT OUTPUTTING APPARATUS, WAVELENGTH DIVISION MULTIPLEXING METHOD IN OPTICAL COMMUNICATION SYSTEM AND METHOD FOR CORRECTING RELATION BETWEEN CONTROL

BACKGROUND OF THE INVENTION

1. Field of the Invention

The present invention relates to an optical filter that can select a predetermined wavelength out of light of multiple wavelengths. The present invention also concerns a wavelength control method of output light from a light source, carried out using the optical filter. The invention further concerns a wavelength division multiplexing method in an optical communication system.

2. Related Background Art

The wavelength division multiplex communication can have a lot of independent channels in a transmission line. Since the channels are independent of each other, there is no need to match transmission rates of the respective channels with each other, and it is also suitable for multimedia communication, which requires flexibility of network.

An example of the wavelength division multiplex communication system in a system with each terminal equipment having a set of wavelength-tunable optical transmitter and optical receiver. The terminal equipment about to transmit a signal tunes a wavelength of a tunable light source in the optical transmitter to a wavelength (corresponding to a "channel" in the wavelength division multiplex communication) not used for communication. On the other hand, the terminal equipment going to receive the signal turns a center wavelength of a transmitted spectrum by an optical band-pass filter (as will be referred to hereinafter as an optical filter), which is tunable in transmitted wavelengths, in the optical receiver to the wavelength received (the center wavelength will be called as a wavelength of the optical filter), and then receives the signal. A wavelength range that can be used by the system is limited by tunable wavelength ranges of the optical transmitter and optical receiver. Wavelength gaps between the channels (hereinafter referred to as channel gaps) are determined based on the width of the transmitted spectrum by the optical filter in the optical receiver.

A tunable semiconductor laser (in the following description, a semiconductor laser will be called LD) can be used as the wavelength tunable light source. Researches are on the way for expanding the tunable wavelength range of the tunable LD, but with LDs in the practical level at present, e.g., multi-electrode DBR (Distributed Bragg Reflector) type or DFB (Distributed FeedBack) type LDs, the tunable wavelength range is several nm. An example is the one described in "Three-electrode-length resonator λ/4 shift MQW-DFB laser," OQE 89-116, the publication from The Institute of Electronics, Information and Communication Engineers. Furthermore, an example of the wavelength-tunable filter is a Fabry-Perot resonator type filter. The practical level of the tunable wavelength range is several ten nm and the practical level of the spectral width (a wavelength width at the half level of the peak) is about 0.1 nm. An example is the one described in "A field-worthy, high-performance, tunable fiber Fabry-Perot filter," the publication ECOC '90-605.

In the wavelength division multiplex communication system, many channels can be secured by narrowing the channel gaps and transmitting the signals in the same tunable range for each channel. In order to keep the gaps smaller than a change width due to drift of wavelength of LD and optical filter, control is necessary to reducing influence of the drift of wavelength. In order to reduce the influence of drift of wavelength, it is necessary to stabilize the wavelength absolutely or relatively. It is, however, not easy to establish an absolute reference of wavelength. It is also difficult to achieve relative stabilization in such a communication system with optical transmitters located at remote places as LAN (Local Area Network).

The subject of the present invention is to provide a method for correcting the relation between a control signal for controlling a selecting wavelength of the optical filter, and the selecting wavelength of the optical filter. The subject also resides in controlling a wavelength of output light from a light outputting apparatus for outputting the light, by the constitution equivalent to the method for correcting the relation between the control signal for controlling the selecting wavelength of the optical filter, and the selecting wavelength of the optical filter (or based on the same concept). The subject also resides in arranging a plurality of wavelengths of wavelength-multiplexed light in high density, utilizing the wavelength controlling method.

SUMMARY OF THE INVENTION

In order to achieve the above subject, the present invention provides a control method of the selecting wavelength of the optical filter as described below.

A method for controlling a selecting wavelength of an optical filter in a light detecting device having the optical filter the selecting wavelength of which can be controlled by a control signal, comprising steps of:

changing values of said control signal to change the selecting wavelength of said optical filter thereby within a wavelength range comprising wavelengths of light of first and second wavelengths generated by optical frequency modulation;

detecting a difference between a first value, which is a value of said control signal when said optical filter selects said light of the first wavelength, and a second value, which is a value of said control signal when said optical filter selects said light of the second wavelength; and determining, based on the difference between said first value and said second value, a change amount of values of the control signal necessary for a change from a state in which the selecting wavelength of said optical filter is a third wavelength with the control signal of a third value to a state in which the selecting wavelength is a fourth wavelength with the control signal of a fourth value.

This method can correct the relation between the control signal for controlling the selecting wavelength of the optical filter and the selecting wavelength of the optical filter even with change therein.

In the above method, when the first or second wavelength is largely different from the third or fourth wavelength, nonlinearity in the variable range of the selecting wavelength of optical filter cannot be corrected for. In order to correct for the nonlinearity, the method is arranged so that said third or fourth wavelength is equal to or close to said first wavelength or said third or fourth wavelength is equal to or close to said second wavelength.

In a preferred example, said change amount of the values of the control signal increases with increase in the difference between said first value and said second value and decreases with decrease therein. In a further preferred example, said change amount of the values of the control signal is proportional to the difference between said first value and said second value.

In the above method for controlling the selecting wavelength of optical filter, the difference between the first value and the second value is used for determining the change amount of the values of the control signal of optical filter. This difference between the first value and the second value can also be used for controlling the wavelength of the output light from the light output device. In this case, however, the control method is the same as the above method for controlling the selecting wavelength of the optical filter in that the difference is used for determining the values of the control signal of optical filter, specifically, for determining a difference between values of the control signal upon selecting light of two wavelengths (the wavelength of the output light and the wavelength of another light in the following). Next described is a method for controlling the wavelength of output light from a light output apparatus according to the present invention.

A wavelength controlling method used in a communication system for carrying out wavelength division multiplex communication, said communication system comprising a light output apparatus having a light detecting device with an optical filter a selecting wavelength of which can be controlled by a control signal, and a light source a wavelength of output light from which can be changed, said wavelength controlling method effecting such control as to keep the wavelength of said output light from the light output apparatus at a predetermined wavelength difference from another wavelength used in said communication system, said wavelength controlling method comprising steps of:

changing values of said control signal to change the selecting wavelength of said optical filter thereby within a wavelength range comprising wavelengths of light of first and second wavelengths generated by optical frequency modulation;

detecting a difference between a first value, which is a value of said control signal when said optical filter selects said light of the first wavelength, and a second value, which is a value of said control signal when said optical filter selects said light of the second wavelength;

changing values of said control signal to change said selecting wavelength of the optical filter thereby within a wavelength range comprising said wavelength of the output light and said wavelength of another light;

detecting a difference between a third value, which is a value of said control signal when said optical filter selects said output light, and a fourth value, which is a value of said control signal when said optical filter selects said another light; and controlling said wavelength of the output light so that the difference between said third value and said fourth value becomes a predetermined value, wherein said predetermined value is determined based on the difference between said first value and said second value.

In this arrangement, there is no need to set an absolute reference wavelength for wavelength control, and absolute wavelength control becomes unnecessary.

In this arrangement, the light of the first and second wavelengths is the light generated by optical frequency multiplexing, and this light of the first and second wavelengths may be other light obtained by optical frequency modulation of the output light or other light modulated in optical frequency. In the case of the other light being used, the effect to correct for the nonlinearity in the tunable range of the selecting wavelength of optical filter is small when the first or second wavelength is apart from the wavelength of the output light or the another light as described above, and the other light used as the light of the first and second wavelengths is desirably light adjacent to the output light on the wavelength axis.

High-accuracy control and high efficiency can be realized when the step of changing said selecting wavelength of the optical filter within the wavelength range comprising the wavelengths of the light of said first and second wavelengths and the step of changing said selecting wavelength of the optical filter within the wavelength range comprising said wavelength of the output light and said wavelength of the another light are carried out within a sweep operation of said selecting wavelength of the optical filter.

The wavelength controlling method as described above can be applied to the wavelength division multiplexing method in the communication system. The wavelength division multiplexing method of the present invention is as follows.

A wavelength division multiplexing method in an optical communication system having a plurality of terminal units, each having an optical transmitter capable of changing a wavelength of output light, and a light detecting device with an optical filter a selecting wavelength of which can be controlled by a control signal, comprising steps of:

changing values of said control signal to change the selecting wavelength of said optical filter thereby within a wavelength range comprising wavelengths of light of first and second wavelengths generated by optical frequency modulation;

detecting a difference between a first value, which is a value of said control signal when said optical filter selects said light of the first wavelength, and a second value, which is a value of said control signal when said optical filter selects said light of the second wavelength;

changing values of said control signal to change said selecting wavelength of the optical filter thereby within a wavelength range comprising a wavelength of output light to be wavelength-controlled and a wavelength of another light different from said wavelength of the output light to be wavelength-controlled, out of output light of said respective terminal units;

detecting a difference between a third value, which is a value of said control signal when said optical filter selects said output light, and a fourth value, which is a value of said control signal when said optical filter selects said another light; and controlling, in a terminal unit for outputting said output light to be wavelength-controlled, said wavelength of the output light so that the difference between said third value and said fourth value becomes a predetermined value, wherein said predetermined value is determined based on the difference between said first value and said second value.

By carrying out this wavelength division multiplexing method, the wavelengths of the output light from the respective terminal units are arranged at predetermined intervals. Even if there is nonlinearity at this time between the control signal for controlling the selecting wavelength of optical filter and the selecting wavelength of optical filter, the gaps between the wavelengths of respective output light are independent of the nonlinearity.

In this arrangement, each terminal unit may have a light detecting device or either one of the terminal units in the communication system may be provided with the light detecting device so that the light detecting device sends a signal for controlling the wavelength of output light to each terminal unit.

A suitable transmission line for outputting the output light from each terminal unit is an optical fiber. There is no specific limitation on the type of the transmission line as long as a passage capable of transmitting light can be assured.

The foregoing described the summary of the present invention, and the following is the general inventive concept of the invention as described above.

In order to correct the relation between the control signal for controlling the selecting wavelength of optical filter and the selecting wavelength of optical filter, the control signal for controlling the selecting wavelength of optical filter is changed so as to change the selecting wavelength of the optical filter in the wavelength range comprising the wavelengths of the light of the first and second wavelengths generated by optical frequency modulation, the difference is detected between the first and second values of the control signal when the light of the two wavelengths is selected, and, letting the third value be a value of the control signal when the optical filter selects the third wavelength and the fourth value be a value of the control signal when the optical filter selects the fourth wavelength, the relation between the wavelength difference between the third wavelength and the fourth wavelength and the difference between the third value and the fourth value is corrected based on the difference between the first value and the second value.

DETAILED DESCRIPTION OF THE PREFERRED EMBODIMENTS

First explained is the basic method of the present invention. The basic method of the present invention comprises arranging wavelengths of respective optical transmitters in a network at regular intervals in the order of start of transmission on the longer wavelength side (or on the shorter wavelength side). This method necessitates neither absolute nor relative wavelength reference.

Here are some preconditions for specifying and simplifying the description.

(a) Modulation of the LD for transmitting the signal, applied herein, is a binary, direct, optical frequency modulation method. The direct, optical frequency modulation is a modulation method in which a modulation current of approximately several mA corresponding to a transmit signal is superimposed on an injection current for a dynamic single-mode semiconductor laser, such as a DFB-LD (Distributed FeedBack Laser Diode), whereby the emission wavelength of LD is switched between a mark wavelength and a space wavelength corresponding to "1" and "0" of transmit signal. The term "optical frequency" is used because a wavelength difference between the mark wavelength and the space wavelength is in the order of GHz (1 GHz corresponds to 0.008 nm for wavelengths in the 1.55 $\mu$m band).

(b) In each channel a mark wavelength of an optical frequency modulation spectrum is located on the longer wavelength side with respect to a space wavelength thereof.

(c) A gap between channels upon optical frequency modulation is a wavelength difference between a space wavelength of a longer-wavelength-side channel and a mark wavelength of a shorter-wavelength-side channel.

(d) The wavelengths of respective optical transmitters are assumed to be arranged at regular intervals in the order of start of transmission on the longer wavelength side.

The basic method will be described in detail with reference to the drawings.

Figure 5:
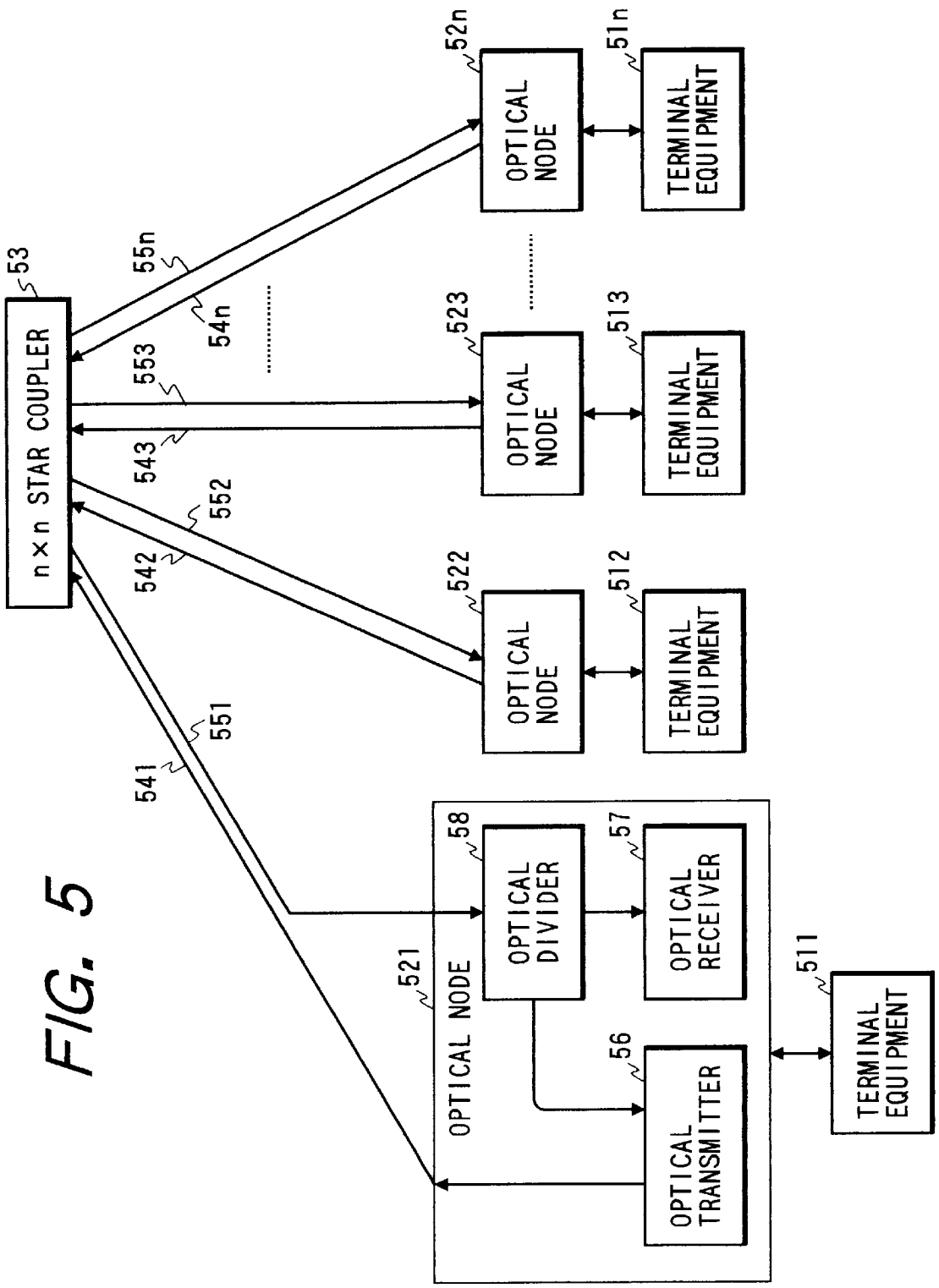
FIG. 5 is a structural drawing of an optical communication system.

FIG. 5 is a structural drawing of an example of the optical communication system using optical transmitters to which the wavelength controlling method is applied. This system is a star type network with terminal equipment numbering n. As illustrated, the network is composed of the terminal equipment 51<sub>1</sub> to 51<sub>n</sub>, optical nodes 52<sub>1</sub> to 52<sub>n</sub>, n×n (mutual communication between n terminals) star coupler 53, and optical fibers 54<sub>1</sub> to 54<sub>n</sub> and 55<sub>1</sub> to 55<sub>n</sub>. Each of the optical nodes 52<sub>1</sub> to 52<sub>n</sub> is comprised of an optical transmitter 56, an optical receiver 57, and an optical divider 58.

The terminal equipment 51<sub>1</sub> to 51<sub>n</sub> each is connected through each optical node 52<sub>1</sub> to 52<sub>n</sub> to the network. Each optical node 52<sub>1</sub> to 52<sub>n</sub> is connected through the optical fiber for transmission 54<sub>1</sub> to 54<sub>n</sub> and through the optical fiber for reception 55<sub>1</sub> to 55<sub>n</sub> to the n×n star coupler 53. Transmit light from the optical transmitter 56 is sent through the optical fiber for transmission 54<sub>1</sub> to 54<sub>n</sub> to the n×n star coupler 53. The n×n star coupler 53 splits the transmit light evenly into the optical fibers for reception 55<sub>1</sub> to 55<sub>n</sub> including the one to the transmitting terminal, thus sending the light to each optical node 52<sub>1</sub> to 52<sub>n</sub>. The optical divider 58 divides the incident light from the optical fiber for reception 55<sub>1</sub> to 55<sub>n</sub> into two, which are supplied to the optical receiver 57 and to the optical transmitter 56. The optical transmitter 56 detects the transmit wavelength in the optical fiber from the light signal thus received to search for an unoccupied channel. This arrangement causes the optical filter of each optical transmitter 56 to receive the transmit light of its own terminal (home terminal) as well as the transmit light of other terminals.

Figure 6:
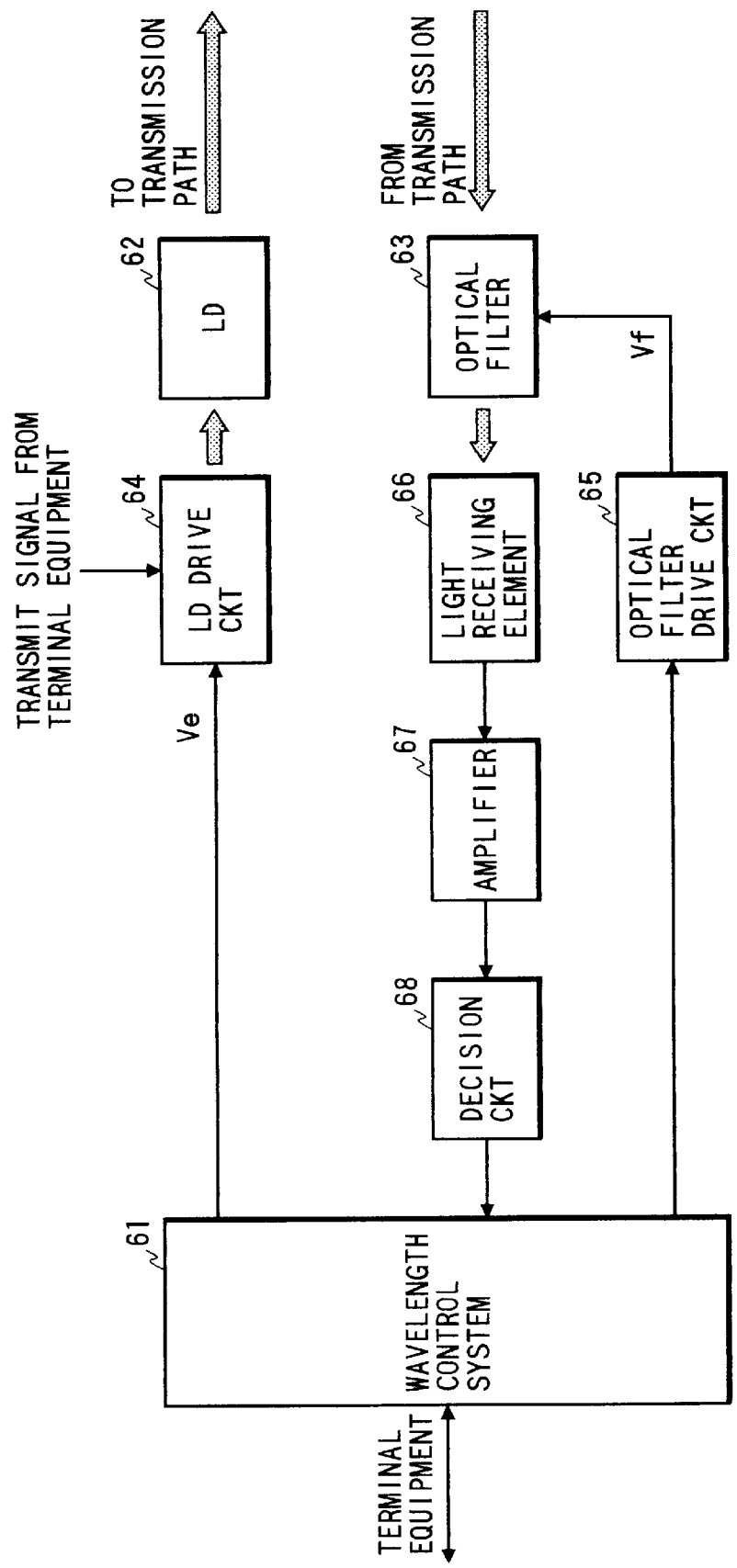
FIG. 6 is a structural drawing of an optical transmitter to which the wavelength controlling method of the present invention is applied.

FIG. 6 is a structural drawing of the optical transmitter to which the present invention is applied. As illustrated, this optical transmitter is comprised of a wavelength control system 61, a tunable LD 62, a transmitted-wavelength-tunable optical filter 63, an LD drive circuit 64, an optical filter drive circuit 65, a light receiving element 66, an amplifier 67, and a decision circuit 68.

The wavelength control system 61 performs the tuning operation to control the LD drive circuit 64 and optical filter drive circuit 65, based on an output signal from the decision circuit 68. Start of tuning and the like is controlled by the terminal equipment. The wavelength control system 61 comprises an arithmetic processing circuit, a memory element, an A/D converter, and a D/A converter. The memory element stores parameters necessary for the tuning operation, operational procedures, etc.

The LD 62 and optical filter 63 employed herein are the elements as described in the above description of the conventional example. The bandwidth (a half width, which will be referred to hereinafter as $\lambda fb$) of a transmission spectrum of the optical filter 63 is a major factor for determining the channel gap. The bandwidth $\lambda fb$ is set at an appropriate value not more than a fraction of the channel gap (1/10, for example). The tunable wavelength range of the optical filter 63 is usually greater than the tunable wavelength ranges of the all LDs in the system.

The LD drive circuit 64 drives the LD 62 (or injects an electric current thereto) so as to achieve a wavelength corresponding to an LD control voltage (hereinafter referred to as Ve) from the wavelength control system 61. In the case of the aforementioned three-electrode-length resonator $\lambda/4$ shift MQW-DFB laser being used, this LD drive circuit 64 gives three outputs. A change amount of the LD control voltage Ve is proportional to a change amount of the wavelength of LD 62. Let Vemin be the LD control voltage Ve corresponding to the shortest wavelength in the tunable wavelength range of LD 62 and Vemax be the LD control voltage Ve corresponding to the longest wavelength therein.

The modulation method of LD 62 by the transmit signal from the terminal equipment, employed herein, is the binary, direct, optical frequency modulation. In correspondence to the spaces (corresponding to "0" of digital signal) and the marks (corresponding to "1" of digital signal) of the transmit signal received, the LD drive circuit 64 superimposes modulation components on the injection current for LD 62, thereby modulating the wavelength thereof to the space wavelength (hereinafter referred to as $\lambda s$) and the mark wavelength (hereinafter referred to as $\lambda m$).

The optical filter drive circuit 65 drives the optical filter 63 by an optical filter drive voltage (hereinafter referred to as Vf) corresponding to an optical filter control voltage from the wavelength control system 61. Let Vfmin be the optical filter drive voltage Vf corresponding to the shortest wavelength in the tunable wavelength range of the optical filter 63 and Vfmax be the optical filter drive voltage Vf corresponding to the longest wavelength therein.

The light transmitted by the optical filter 63 is converted into an electric signal by the light receiving element 66 and the electric signal is supplied through the amplifier 67 to the decision circuit 68.

A threshold value of the decision circuit 68 is set to a value not more than an output from the amplifier 68 when coincidence is made between the wavelength of each channel incident from the transmission line to the optical filter 63 and the wavelength of the optical filter 63 (for example, to a half value thereof). The decision circuit 68 outputs H for an input signal equal to or greater than the threshold value or L otherwise (where H represents "1" of digital signal while L "0" of digital signal).

Figure 7:
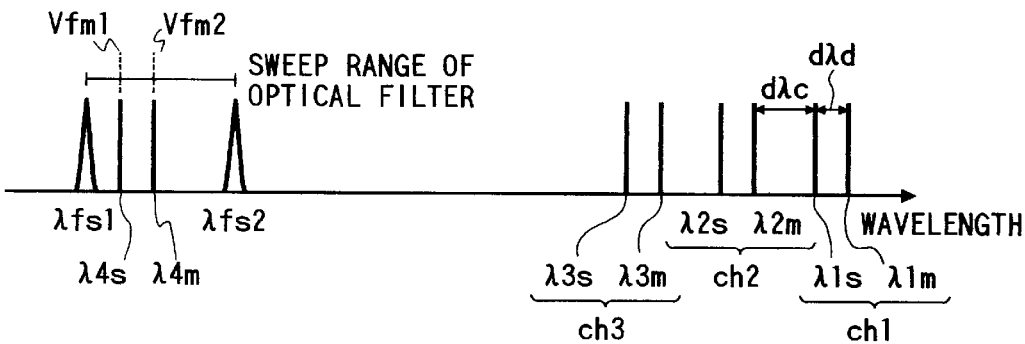
FIG. 7 is an explanatory drawing to illustrate the operation that is a basis of the wavelength controlling method of the present invention.
Figure 7:
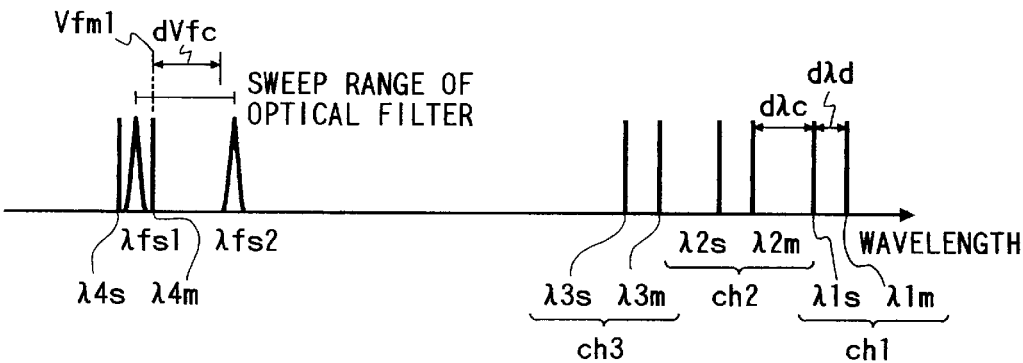
Figure 7:
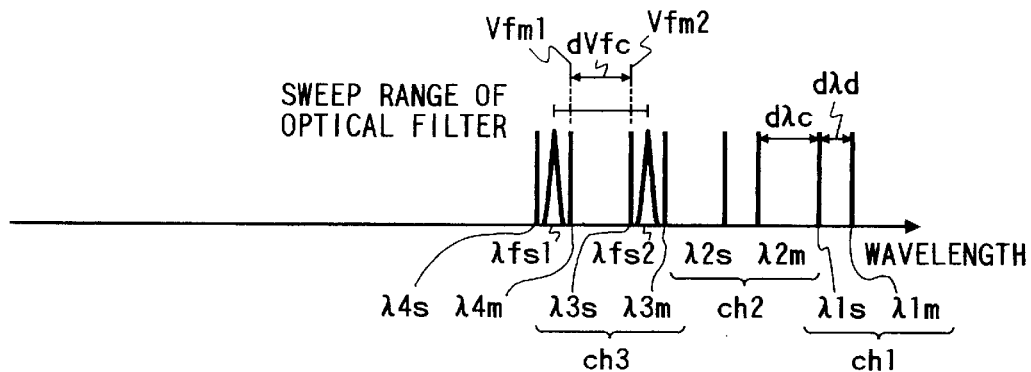

FIG. 7 is an explanatory drawing to illustrate the operation being the basis of the wavelength control method. The operation includes "operation 1" and "operation 2," and FIG. 7 shows the positional relation among wavelengths of LD 62 and optical filter 63 in each operation. In the drawing, $\lambda ns$ and $\lambda nm$ (n=1 to 3) represent wavelengths of optical transmitters 56 under transmission when an optical transmitter 56 the operation of which is going to be explained starts tuning. Symbol $\lambda ns$ represents the space wavelengths of optical frequency modulation signal while $\lambda nm$ the mark wavelengths of optical frequency modulation signal. Further, $\lambda 4s$ and $\lambda 4m$ are the space wavelength and the mark wavelength of LD 62 in the optical transmitter 56 the operation of which is going to be explained. In addition, $d\lambda c$ stands for the channel gap and $d\lambda d$ for the wavelength difference between the mark wavelength and the space wavelength. Also, $\lambda fs1$ is a sweep start wavelength of the optical filter 63 while $\lambda fs2$ a sweep end wavelength of the optical filter 63. Symbol dVfc denotes a value of the optical filter drive voltage Vf corresponding to $d\lambda c$. Further, Vfm designates a margin of the sweep range for surely detecting wavelengths of home-terminal and adjacent channels. The margin Vfm is set to a value of approximately one fifth of the channel gap.

Next explained is the basic method.

The wavelength range used in the wavelength division multiplex communication system will be called a wavelength multiplex region herein. The tunable wavelength range of LD 62 in each optical node $52_1$ to $52_n$ is within the wavelength multiplex region, and the tunable wavelength ranges of the optical filer 63 in the optical transmitter 56 of optical node $52_1$ to $52_n$ and the optical filter in the optical receiver 57 (for selection of channel and for detection of optical frequency modulation signal) include the wavelength multiplex region.

Detection of wavelength is carried out by sweeping the optical filter 63. The output from the decision circuit 68 becomes H only if the wavelength of the optical filter 63 becomes coincident with the wavelength of another terminal or home terminal LD 62. The wavelength control system 61 stores a control voltage (the LD control voltage Ve in the case of LD 62 or the optical filter drive voltage Vf in the case of the optical filter 63) with the output from the decision circuit 68 becoming H upon sweeping the wavelength of LD 62 or optical filter 63. A step Vfs of the optical filter drive voltage Vf upon sweep is set so that a wavelength change amount of the optical filter 63 with change of Vfs in the optical filter drive voltage Vf is smaller than the half width $\lambda fb$ of the optical filter 63. When the sweep step of wavelength is set smaller than the transmission spectrum width of the optical filter 63, control voltages achieving H could appear continuously. In that case an average is taken for those voltages.

The tuning operation is repetitions of operation including a cycle of wavelength detection and shift of wavelength of LD 62. The basic method includes two operations, "operation 1" and "operation 2."

Now, described are memory values used in an operation cycle or between operation cycles. LD drive voltage Vem is a memory value of LD control voltage Ve for controlling the wavelength of LD 62 between two consecutive operation cycles. Vfm1, Vfm2, and Vfm3 are memory values of optical filter drive voltage Vf corresponding to detected wavelengths used within one operation cycle or between two consecutive operation cycles.

(A) "Operation 1" Setting Vem=Vemin and Ve=Vem, the LD 62 is activated to emit light in the shortest wavelength and the optical filter drive voltage Vf is swept in the increasing direction from Vfmin. During sweep the wavelength of the optical filter 63 successively comes to coincide with λ4s and λ4m. The wavelength control system 61 stores optical filter drive voltages Vf when the wavelength of the optical filter 63 coincides with λ4s and λ4m, as Vfm1 and Vfm2, respectively. The sweep of the optical filter 63 is continued up to Vfm2+dVfc+Vfm.

If the optical filter 63 does not coincide with another wavelength between the memory value Vfm2 of the optical filter drive voltage Vf and the sweep end, it is determined that there is an unoccupied area in the wavelength multiplex region. Then the value of Vfm1 is changed to the value of Vfm2 and then "operation 2" is carried out. If the optical filter 63 coincides with another wavelength between the memory value Vfm2 of the optical filter drive voltage Vf and the sweep end, it is determined that there is no unoccupied area in the wavelength multiplex region. Then the tuning operation is suspended to stop light emission of LD 62.

(B) "Operation 2" Setting the LD control voltage Vem to the value in the previous operation and Ve=Vem, the optical filter drive voltage Vf is swept from Vfm1−Vfm to Vfm1+dVfc+Vfm. The control system stores, as Vfm1, the optical filter drive voltage Vf when the output from the decision circuit 68 first becomes H during sweep and, as Vfm2, the optical filter drive voltage Vf when the output, thereafter having turned to L once, again becomes H (whereas Vfm2=Vfm1+dvfc+Vfm unless the output turned again to H).

Then the following setting is effected;

$Vem=Vem$ if $|Vfm2-Vfm1-dVfc| \leq Vfs$;

$Vem=Vem-Ves$ if $Vfm2-Vfm1-dVfc < -Vfs$;

$Vem=Vem+Ves$ if $Vfm2-Vfm1-dVfc > Vfs$, and this "operation 2" is repeated. Here, Ves is a step voltage of the LD control voltage Ve upon wavelength shift of LD 62. A wavelength change amount of LD 62 with change of the step voltage Ves in the LD control voltage Ve is set to be not more than approximately the half width λfb of the optical filter 63.

This operation successively shifts λ4s and λ4m to the longer wavelength side, and the LD drive voltage Ve is controlled to increase to achieve a wavelength defining the wavelength gap of dVfc with respect to the space wavelength λ3s of an adjacent channel on the longer wavelength side. Supposing, from a constant steady state, transmission of certain terminal equipment is finished to eliminate the light of a wavelength thereof, the optical transmitter 56 on the shorter wavelength side thereof performs the above operation to shift the wavelength to the longer wavelength side, thereby effecting such control as to achieve a wavelength with the wavelength gap again being determined by dVfc with respect to the space wavelength of the adjacent channel. In this way, in the stead state the space wavelength of the adjacent channel and the mark wavelength of the home terminal are arranged in order from the longer wavelength side with the wavelength gap dλc determined by dVfc. In the drawing, (1) indicates a state at the time of start of shift, and (2) indicates the steady state where the wavelength gap is maintained after completion of shift. If Vem≧Vemax is achieved on the way of repeating this operation (or if there is no terminal equipment transmitting a signal before start of transmission of this terminal equipment), the tuning operation is ended to maintain the state of Ve=Vemax.

The present invention is a further improvement in the basic method as described above.

Figure 8:
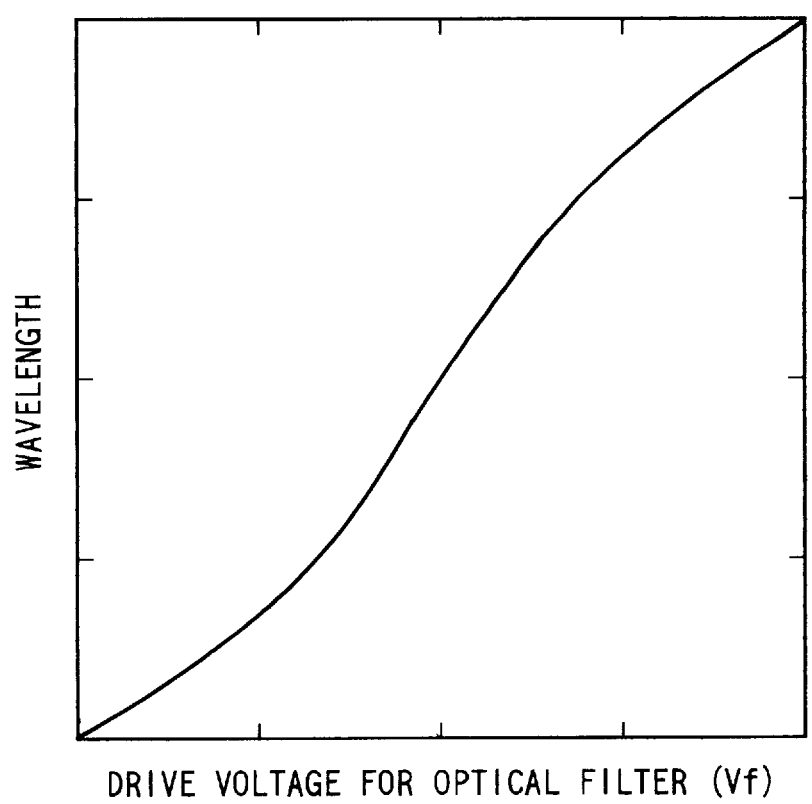
FIG. 8 is a drawing to show control voltage-wavelength characteristics of an optical filter.

In the above method the channel gap is determined by the voltage difference dVfc of the optical filter drive voltage Vf. If there are element-to-element differences in the wavelength characteristics of the optical filter drive voltage Vf of the optical filter 63 used in each optical node 521 to 52n, dVfc must be set node by node. If the wavelength characteristics of the optical filter drive voltage Vf of the optical filter 63 are not proportional but nonlinear as shown in FIG. 8, the wavelength gap determined by dVfc varies even with one optical filter 63 so as to make the channel gaps different from each other.

Figure 9:
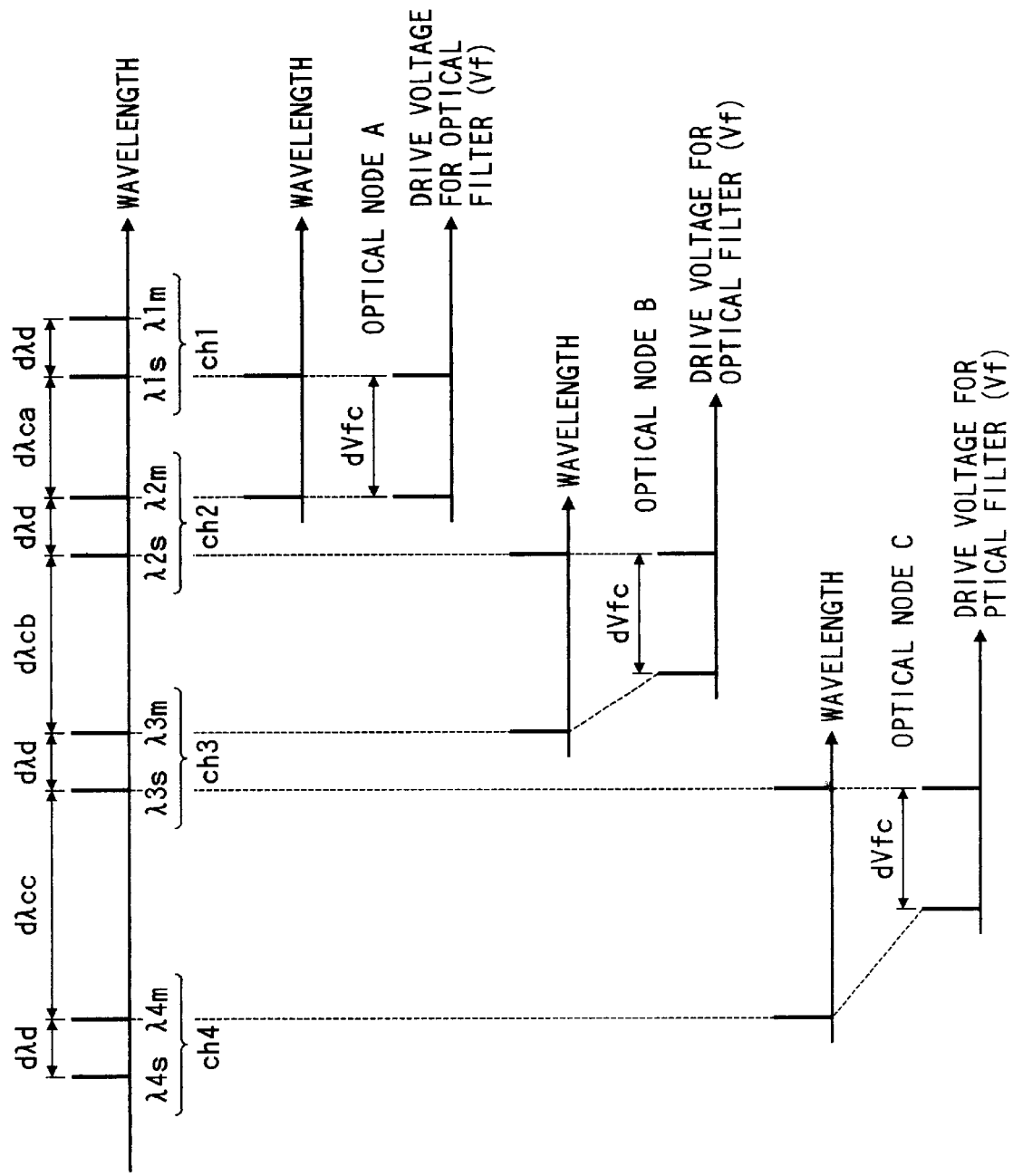
FIG. 9 is an explanatory drawing to illustrate the principle that is a basis of the wavelength controlling method of the present invention.

FIG. 9 shows such a state. In this example four channels (ch1 to ch4) are arranged. The top part shows the overall arrangement. In the drawing, dλd indicates a self wavelength gap between the mark wavelength and the space wavelength in each channel, and dλca, dλcb, dλcc indicate adjacent wavelength gaps maintained by optical nodes A, B, C. Below the top part there is shown the relation between filter control voltage and adjacent wavelength gap to an adjacent channel in node A (ch2), node B (ch3), and node C (ch4). When the channel gaps are controlled by the constant value dVfc, the wavelength gap to an adjacent channel in each optical node will differ from those in the other optical nodes (dλca<dλcb<dλcc in the drawing).

In the present invention, as shown below as embodiments, dVfc corresponding to the adjacent wavelength gap dλc is determined with a reference of the wavelength difference dλd between the mark wavelength and the space wavelength of optical frequency modulation, whereby the channel gaps can be kept constant even with the element-to-element differences or the nonlinearity of the wavelength characteristics of the optical filter drive voltage Vf of optical filter 63.

Embodiments

[First Embodiment]

The first embodiment of the present invention will be described in detail with reference to the drawings.

Figure 1:
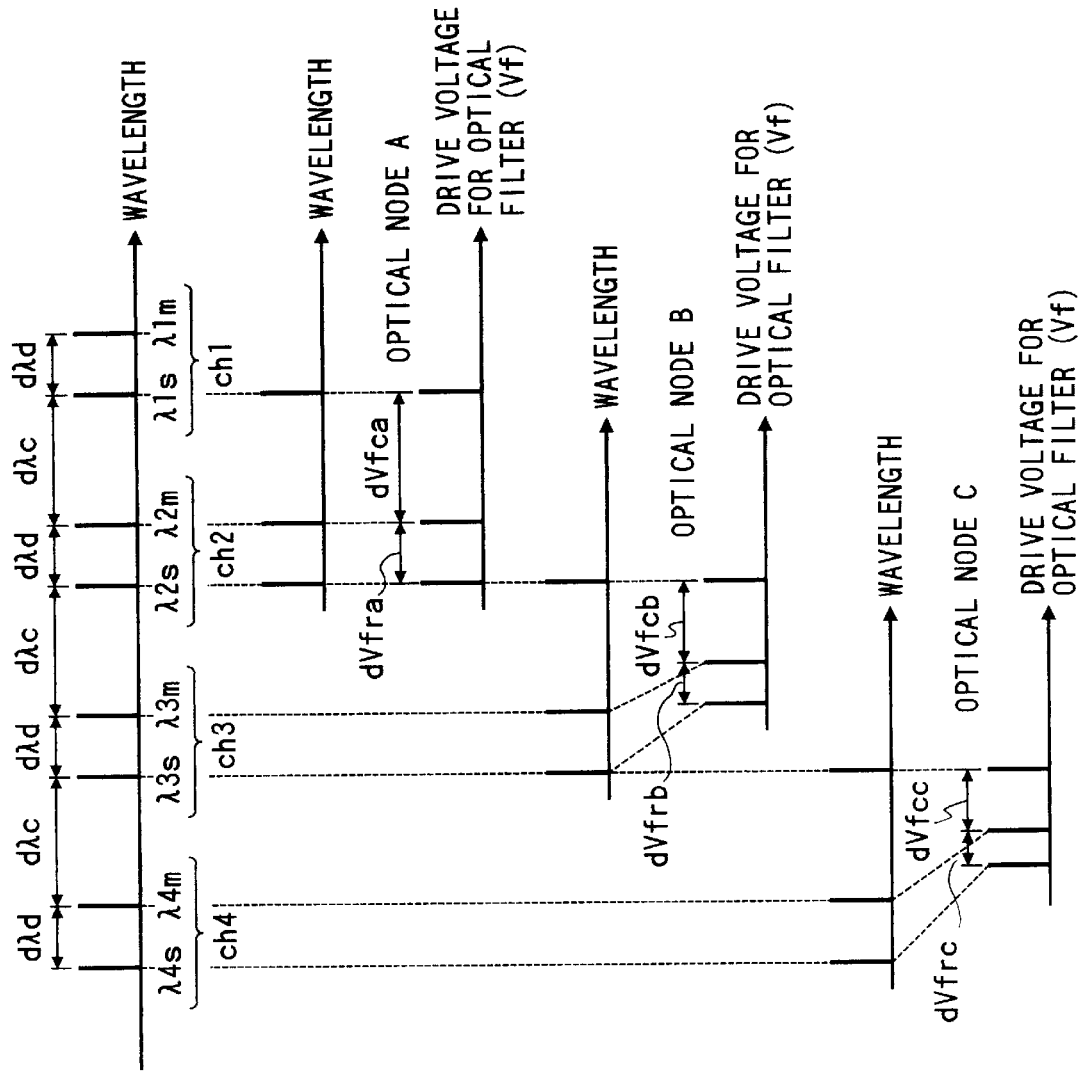
FIG. 1 is an explanatory drawing to illustrate the principle of the first embodiment of the wavelength controlling method of the present invention.

FIG. 1 is an explanatory drawing to illustrate the principle of the first embodiment of the wavelength controlling method of the present invention. The following description is given as assuming that the optical communication system, the optical transmitters of optical nodes, etc. used in the present embodiment are the same as in the structure described with FIG. 5 and FIG. 6. The overall wavelength arrangement with four channels (ch1 to ch4) being in a steady state is shown in the top part. In the drawing, there are three optical nodes holding a wavelength gap to an adjacent channel; optical node A (ch2), optical node B (ch3), and optical node C (ch4). There is shown the relation between the optical filter drive voltage Vf and wavelengths in the wavelength detection range (or in the sweep range of the optical filter 63) in each optical node. In the drawing, dλd represents a self wavelength gap between the mark wavelength and the space wavelength in one channel, and dλc a channel gap being an adjacent wavelength gap between the mark wavelength of a home terminal and the space wavelength of an adjacent terminal. Further, dVfra and dVfca indicate a reference voltage of the optical node A corresponding to the self wavelength gap dλd and a channel gap setting voltage of the optical node A corresponding to the adjacent wavelength gap dλc. In addition, dVfrb, dVfcb, dVfrc, dVfcc are also setting values of optical filter drive voltage Vf for optical nodes B, C similarly.

Figure 2:
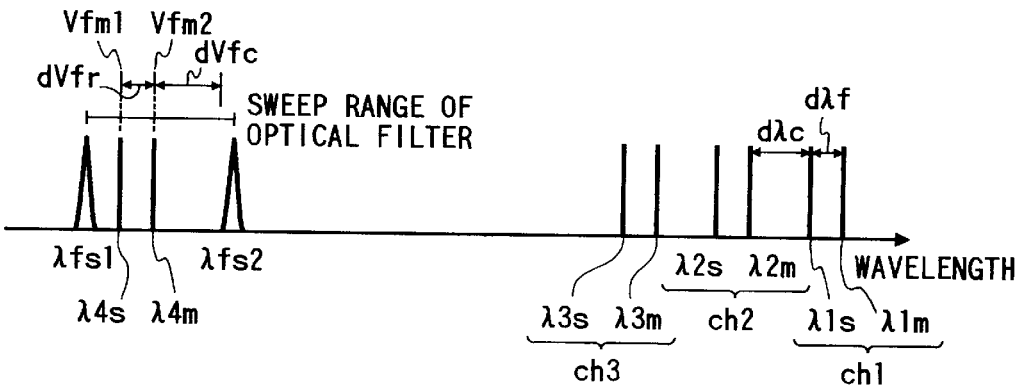
FIG. 2 is an explanatory drawing to illustrate the operation of the first embodiment of the wavelength controlling method of the present invention.
Figure 2:
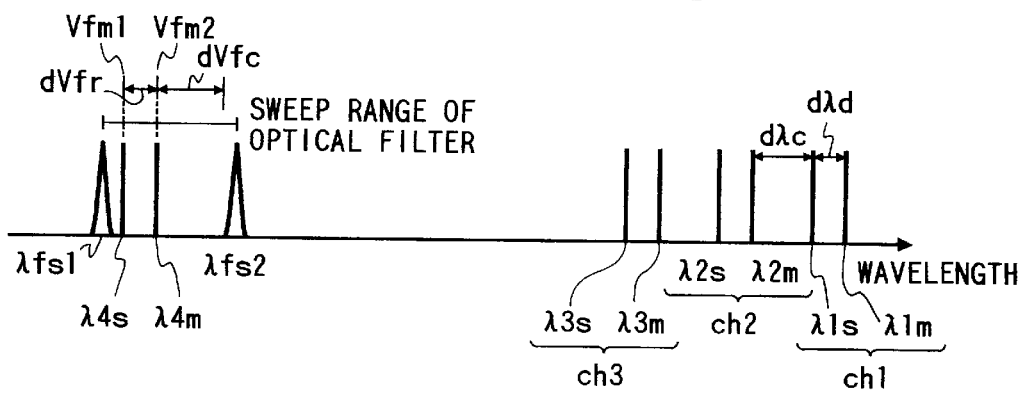
Figure 2:
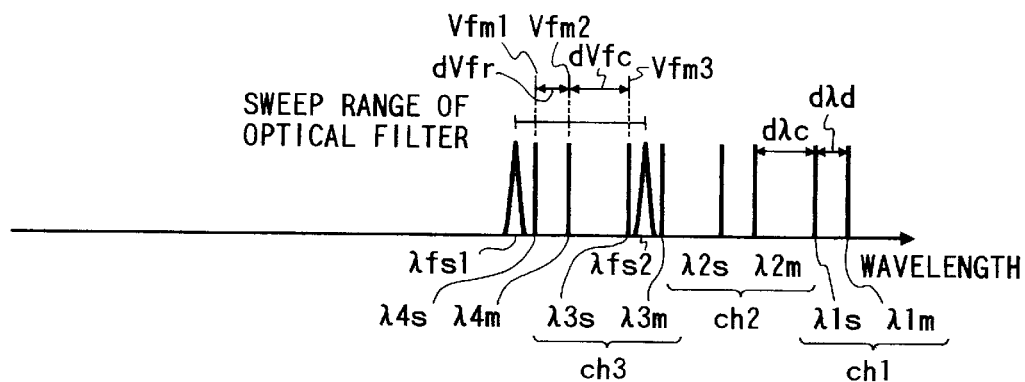

FIG. 2 is an explanatory drawing to illustrate the operation of the first embodiment of the wavelength controlling method of the present invention. The operation includes "operation 1" and "operation 2," and the drawing shows the positional relation among wavelengths of LD 62 and optical filter 63 in each operation. In the drawing, dVfr designates the reference voltage being a reference for setting of channel gap. The other symbols are the same as in FIG. 7 used in the description of the basic method.

In the optical frequency modulation the gap between the mark wavelength and the space wavelength is an important parameter of the modulation and is kept within a desired accuracy from a certain value. The present invention uses this gap as a reference to correct the wavelength characteristics of the optical filter drive voltage Vf of the optical filter 63. In the present embodiment the reference employed is the gap between the mark wavelength and the space wavelength of the home terminal.

(a) "Operation 1" This operation is substantially the same as (A) "operation 1" of the basic method except that the value of the optical filter drive voltage Vfm1 is not changed to the value of Vfm2 upon next performing "operation 2." If this operation results in determining that there is an unoccupied wavelength area, "operation 2" will be carried out subsequently.

(b) "Operation 2" Setting the LD control voltage Vem to the value in the previous operation and Ve=Vem, the optical filter drive voltage Vf is swept from Vfm1−Vfm up to Vfm2+dVfc+Vfm (in which dVfc will be explained below). The control system stores as Vfm1 the optical filter drive voltage Vf when the output from the decision circuit 28 first becomes H during sweep, as Vfm2 the optical filter drive voltage Vf when the output, thereafter having turned to L once, again becomes H, and as Vfm3 the optical filter drive voltage Vf when the output, further having turned to L once, again becomes H. Vfm1, Vfm2, Vfm3 correspond to λ4s, λ4m, λ3s, respectively. However, if λ3s is not within the sweep range of the optical filter 63, Vfm3 will have no input value. In this case, it is set as follows:

$$Vfm3=Vfm2+dVfc+Vfm.$$

Here, $$dVfc=k \times dVfr$$

$$dVfr=Vfm2-Vfm1$$

where k is a value not less than 1 (1.5, for example).
Then the following setting is effected;

$$Vem=Vem \text{ if } |Vfm3-Vfm2dVfc| \leq Vfs;$$

$$Vem=Vem-Ves \text{ if } Vfm3-Vfm2dVfc<-Vfs;$$

$$Vem=Vem+Ves \text{ if } Vfm3-Vfm2-dVfc>Vfs,$$

and this "operation 2" is repeated.

The above value dVfc is obtained from dVfr measured every sweeping, whereby dVfc changes depending upon the sweep wavelengths of optical filter 63 and the wavelength gap corresponding to dVfc is kept constant.
In the example of FIG. 1, $$dVfra>dVfrb>dVfrc;$$

corresponding thereto, $$dVfca>dVfcb>dVfcc;$$

then all channel gaps are kept to be equal wavelength gaps between ch1 and ch2, between ch2 and ch3, and between ch3 and ch4.

The present embodiment showed the example for obtaining the adjacent wavelength gap by multiplying the self wavelength gap by the predetermined coefficient, which utilized the fact that the characteristics of transmitted wavelength against the optical filter drive voltage of optical filter 63 show good linearity in a narrow wavelength range and which generally matched the characteristics of actual optical filters. Accordingly, the above wavelength controlling method can keep the wavelength gap almost constant in each channel.

[Second Embodiment]

The second embodiment of the present invention will be described in detail with reference to the drawings.

Figure 3:
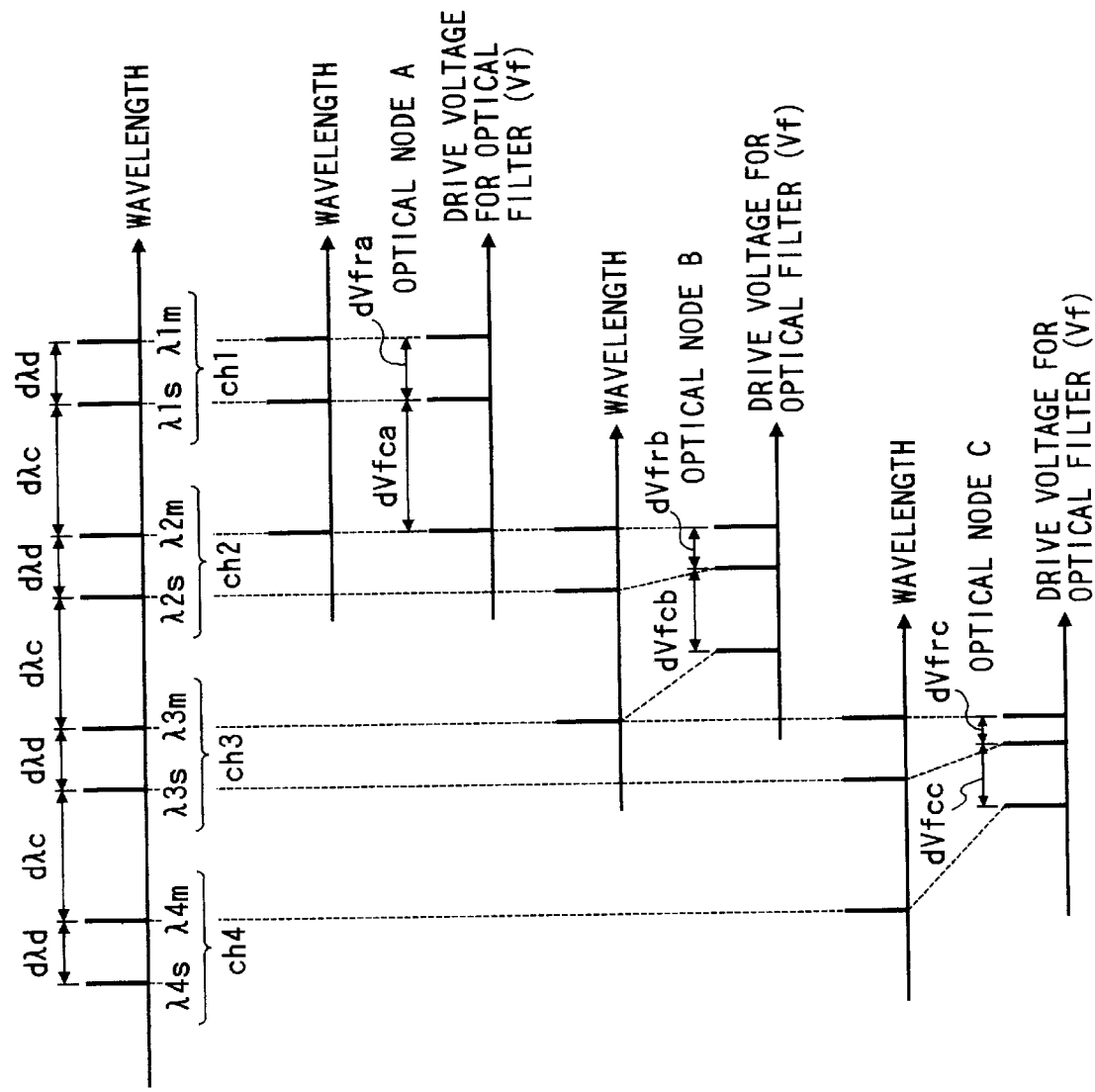
FIG. 3 is an explanatory drawing to illustrate the principle of the second embodiment of the wavelength controlling method of the present invention.

FIG. 3 is an explanatory drawing to illustrate the principle of the second embodiment of the wavelength controlling method of the present invention. The notation in the drawing is the same as that in FIG. 1. The structure of the present embodiment is substantially the same as that explained in FIG. 5 and FIG. 6 and the description thereof is omitted herein.

Figure 4:
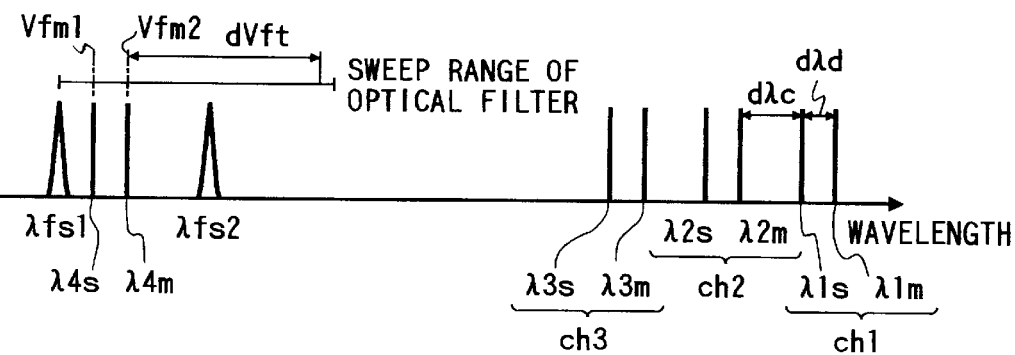
FIG. 4 is an explanatory drawing to illustrate the operation of the second embodiment of the wavelength controlling method of the present invention.
Figure 4:
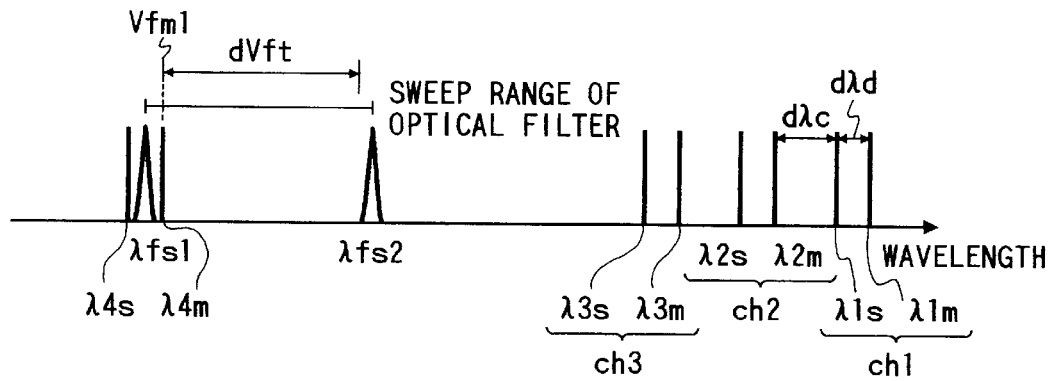
Figure 4:
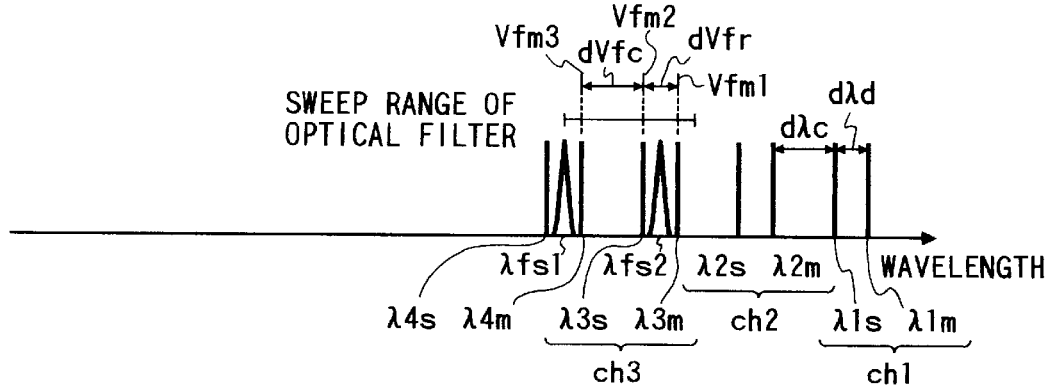

FIG. 4 is an explanatory drawing to illustrate the operation of the second embodiment of the wavelength controlling method of the present invention. The operation includes "operation 1" and "operation 2," and the drawing shows the positional relation among wavelengths of LD 62 and optical filter 63 in each operation. The symbols in the drawing are the same as in FIG. 2.

In the present embodiment the reference is a gap between the mark wavelength of an adjacent channel and the space wavelength of a home terminal.

(a) "Operation 1" This operation is the same as (A) "operation 1" of the basic method. When this operation results in determining that there is an unoccupied wavelength area, "operation 2" is carried out subsequently.

(b) "Operation 2" This operation corresponds to the first operation in "operation 2" of the first embodiment. Setting the LD control voltage Vem to the value in the previous operation and Ve=Vem, the optical filter drive voltage Vf is swept from Vfm1−Vfm to Vfm2+dVft+Vfm. Here, dVft is a Vf-wavelength characteristic of optical filter 63, which is an optical filter drive voltage range excluding a margin for the sweep range of optical filter calculated in a portion with the smallest wavelength change rate against optical filter drive voltage Vf and which is set to a value greater than the optical filter drive voltage Vf against a wavelength change dλc+dλd. The control system stores as Vfm1 the optical filter drive voltage Vf when the output from the decision circuit 28 first becomes H during sweep, as Vfm2 the optical filter drive voltage Vf when the output, thereafter having turned to L once, again becomes H, and as Vfm3 the optical filter drive voltage Vf when the output, further having turned to L once, again becomes H (though no value is stored in Vfm2 and Vfm3 before λ4s and λ3m come into the sweep range of optical filter 63). Then the following setting is effected:

$$Vem=Vem+Ves,$$

and this "operation 2" is repeated.

After during sweep of optical filter 63 the output from the decision circuit 28 has changed from L via H, L, H, L, and H in this order to L and when λ4s and λ3m come into the sweep range of optical filter 63 as well as λ4m, the value of Vfm1 is changed to the value of Vfm3 and "operation 3" described below is carried out subsequently.

(c) "Operation 3" This operation corresponds to the second operation in "operation 2" of the first embodiment. Setting the LD control voltage Vem to the value in the previous operation and Ve=Vem, the optical filter drive voltage Vf is swept from Vfm1+Vfm to Vfm2−dVft−Vfm (swept from the longer wavelength side to the shorter wavelength side). The control system stores as Vfm1 the optical filter drive voltage Vf when the output from the decision circuit 68 first becomes H during sweep, as Vfm2 the optical filter drive voltage Vf when the output, thereafter having turned to L once, again becomes H, and as Vfm3 the optical filter drive voltage Vf when the output, further having turned to L once, again becomes H. Vfm1, Vfm2, Vfm3 correspond to $\lambda 3m$, $\lambda 3s$, $\lambda 4m$, respectively. However, no value is input into Vfm3 if $\lambda 4m$ is not in the sweep range of optical filter 63.

In this case, the following setting is effected:

$$Vfm3=Vfm2-dVfc-Vfm.$$

Here, $$dVfc=k \times dVfr$$

$$dVfr=Vfm1-Vfm2$$

where k is a value not less than 1 (1.5, for example).

Then the following setting is effected;

$$Vem=Vem \text{ if } |Vfm2-Vfm3-dVfc| \leq Vfs;$$

$$Vem=Vem-Ves \text{ if } Vfm2-Vfm3-dVfc<-Vfs;$$

$$Vem=Vem+Ves \text{ if } Vfm2-Vfm3-dVfc>Vfs,$$

and this "operation 3" is repeated.

The present embodiment is arranged to start light emission from the shorter wavelength side with respect to the emission wavelengths of other terminals and gradually shift the self-terminal wavelength to the longer wavelength side, wherein "operation 2" searches for an adjacent longer-wavelength-side wavelength and then "operation 3" calculates the adjacent wavelength gap of the mark wavelength of the home terminal with the reference being the self wavelength gap between the mark wavelength and the space wavelength of an adjacent channel, so as to keep and control the wavelength gaps in the steady state, thus enabling to maintain the accurate wavelength gaps.

[Other Embodiments]

For explaining the embodiments specifically, the above embodiments employed the way for shifting the emission wavelength of LD to the longer wavelength side and setting the mark wavelength of optical frequency modulation on the longer wavelength side than the space wavelength, but these may be reversed.

Further, the optical frequency modulation was binary modulation with the mark wavelength and space wavelength, but it is also possible to use ternary or higher modulation. In this case, in order to accurately secure the adjacent wavelength gap to an adjacent terminal, the adjacent wavelength gap is calculated and set using a longer-wavelength-side wavelength gap out of optical frequency modulation wavelengths of a home terminal as a reference. For example, the FSK method employs the binary modulation, but the AMI-FSK method sometimes employs ternary modulation, and thus the present invention is not limited to it.

The constituent elements described in the above embodiments are not limited to those described in the embodiments if they have the same functions (as well as the systems comprised of several constituent elements). The invention may be applied to any structure using two or more frequencies in information transmission from a home terminal.

Further, the numerical values including the coefficient k etc. are not limited to the values described as long as the values are selected from the permissible range of operation.

The above embodiments showed the examples in which a wavelength control system for controlling the wavelength was provided in each optical node, but there is another method for charging a wavelength control node with this wavelength control and arranging each optical node to set the transmit wavelength of each optical node based on an optical signal for control from the wavelength control node in charge, and in this case, the present invention as detailed above can be applied to the aforementioned wavelength control node in charge. In this case, the wavelength control node detects an unoccupied wavelength in the transmission line, sets the accurate unoccupied wavelength at the adjacent wavelength gap as described in the above embodiments, and sends the unoccupied wavelength into the transmission line as putting information indicating the unoccupied wavelength thereon, and each communication node can transmit a signal as emitting the light of the transmit wavelength corresponding to the unoccupied wavelength. In the steady state the wavelength control node may control the wavelengths by sending a control signal of maintaining, shortening, or lengthening the emission wavelength to each communication node as managing the wavelengths as described in the above embodiments.

The above embodiments showed the structure using the optical filter for controlling the transmit wavelength of transmitter, but without being limited to it, the present invention can also be applied to any structure for controlling the selecting wavelength of optical filter.

As explained above, the selecting wavelength controlling method of optical filter of the present invention can always correct the relation between the control signal for controlling the selecting wavelength of optical filter, and the selecting wavelength of optical filter. By using it for wavelength control of output light of transmitter, control can be effected so as to keep gaps to other wavelengths always constant. By applying it to wavelength multiplexing of communication system, dispersion can be decreased in gaps between channels and high-density wavelength multiplexing can be realized.

What is claimed is:

1. A method for controlling a selecting wavelength of an optical filter in a light detecting device having the optical filter the selecting wavelength of which can be controlled by a control signal, comprising steps of:

changing values of said control signal to change the selecting wavelength of said optical filter thereby within a wavelength range comprising wavelengths of light of first and second wavelengths generated by optical frequency modulation;

detecting a difference between a first value, which is a value of said control signal when said optical filter selects said light of the first wavelength, and a second value, which is a value of said control signal when said optical filter selects said light of the second wavelength; and determining, based on the difference between said first value and said second value, a change amount of values of the control signal necessary for a change from a state in which the selecting wavelength of said optical filter is a third wavelength with the control signal of a third value to a state in which the selecting wavelength is a fourth wavelength with the control signal of a fourth value.

2. The method according to claim 1, wherein said third or fourth wavelength is equal to or close to said first wavelength or said third or fourth wavelength is equal to or close to said second wavelength.

3. The method according to claim 1, wherein said change amount of the values of the control signal increases with increase in the difference between said first value and said second value and decreases with decrease therein.

4. The method according to claim 3, wherein said change amount of the values of the control signal is proportional to the difference between said first value and said second value.

5. A wavelength controlling method used in a communication system for carrying out wavelength division multiplex communication, said communication system comprising a light output apparatus having a light detecting device with an optical filter a selecting wavelength of which can be controlled by a control signal, and a light source a wavelength of output light from which can be changed, said wavelength controlling method effecting such control as to keep the wavelength of said output light from the light output apparatus at a predetermined wavelength difference from another wavelength used in said communication system, said wavelength controlling method comprising steps of:

changing values of said control signal to change the selecting wavelength of said optical filter thereby within a wavelength range comprising wavelengths of light of first and second wavelengths generated by optical frequency modulation;

detecting a difference between a first value, which is a value of said control signal when said optical filter selects said light of the first wavelength, and a second value, which is a value of said control signal when said optical filter selects said light of the second wavelength;

changing values of said control signal to change said selecting wavelength of the optical filter thereby within a wavelength range comprising said wavelength of the output light and said wavelength of another light;

detecting a difference between a third value, which is a value of said control signal when said optical filter selects said output light, and a fourth value, which is a value of said control signal when said optical filter selects said another light; and controlling said wavelength of the output light so that the difference between said third value and said fourth value becomes a predetermined value, wherein said predetermined value is determined based on the difference between said first value and said second value.

6. The method according to claim 5, wherein said wavelength of the output light or said wavelength of said another light is equal to or close to said first wavelength or said wavelength of the output light or said wavelength of said another light is equal to or close to said second wavelength.

7. The method according to claim 5, wherein said predetermined value increases with increase in the difference between said first value and said second value and decreases with decrease therein.

8. The method according to claim 7, wherein said predetermined value is proportional to the difference between said first value and said second value.

9. The method according to claim 5, further comprising a step of subjecting said output light to optical frequency modulation, wherein said light of the first and second wavelengths is said output light modulated in optical frequency.

10. The method according to claim 5, wherein said another light is modulated in optical frequency and said light of the first and second wavelengths is said another light modulated in optical frequency.

11. The method according to claim 5, wherein said another light is light adjacent to said output light on a wavelength axis.

12. The method according to claim 5, wherein the step of changing said selecting wavelength of the optical filter within the wavelength range comprising the wavelengths of the light of said first and second wavelengths and the step of changing said selecting wavelength of the optical filter within the wavelength range comprising said wavelength of the output light and said wavelength of said another light are carried out within a sweep operation of said selecting wavelength of the optical filter.

13. A wavelength division multiplexing method in an optical communication system having a plurality of terminal units, each having an optical transmitter capable of changing a wavelength of output light, and a light detecting device with an optical filter a selecting wavelength of which can be controlled by a control signal, comprising steps of:

changing values of said control signal to change the selecting wavelength of said optical filter thereby within a wavelength range comprising wavelengths of light of first and second wavelengths generated by optical frequency modulation;

detecting a difference between a first value, which is a value of said control signal when said optical filter selects said light of the first wavelength, and a second value, which is a value of said control signal when said optical filter selects said light of the second wavelength;

changing values of said control signal to change said selecting wavelength of the optical filter thereby within a wavelength range comprising a wavelength of output light to be wavelength-controlled and a wavelength of another light different from said wavelength of the output light to be wavelength-controlled, out of output light of said respective terminal units;

detecting a difference between a third value, which is a value of said control signal when said optical filter selects said output light, and a fourth value, which is a value of said control signal when said optical filter selects said another light; and controlling, in a terminal unit for outputting said output light to be wavelength-controlled, said wavelength of the output light so that the difference between said third value and said fourth value becomes a predetermined value, wherein said predetermined value is determined based on the difference between said first value and said second value.

14. The method according to claim 13, wherein said wavelength of the output light to be wavelength-controlled or said wavelength of said another light is equal to or close to said first wavelength or said wavelength of the output light to be wavelength-controlled or said wavelength of said another light is equal to or close to said second wavelength.

15. The method according to claim 13, wherein said predetermined value increases with increase in the difference between said first value and said second value and decreases with decrease therein.

16. The method according to claim 15, wherein said predetermined value is proportional to the difference between said first value and said second value.

17. The method according to claim 13, further comprising a step of subjecting said output light to be wavelength-controlled to optical frequency modulation, wherein said light of the first and second wavelengths is said output light to be wavelength-controlled, modulated in optical frequency.

18. The method according to claim 13, wherein said another light is modulated in optical frequency and said light of the first and second wavelengths is said another light modulated in optical frequency.

19. The method according to claim 13, wherein said another light is light adjacent to said output light to be wavelength-controlled on a wavelength axis.

20. The method according to claim 13, wherein the step of changing said selecting wavelength of the optical filter within the wavelength range comprising the wavelengths of the light of said first and second wavelengths and the step of changing said selecting wavelength of the optical filter within the wavelength range comprising said wavelength of the output light to be wavelength-controlled and said wavelength of said another light are carried out within a sweep operation of said selecting wavelength of the optical filter.

21. The method according to claim 13, wherein each terminal unit has said light detecting device and said output light to be wavelength-controlled in each terminal unit is output light from each terminal unit.

22. The method according to claim 13, wherein at least one said light detecting device is provided in said communication system and said light detecting device transmits to a terminal unit for outputting said output light to be wavelength-controlled a signal for controlling the wavelength of said output light to be wavelength-controlled so that the difference between said third value and said fourth value becomes the predetermined value.

23. A method, employed in an optical filter a selecting wavelength of which can be controlled by a control signal, for correcting the relation between a control signal for controlling said selecting wavelength of the optical filter, and said selecting wavelength of said optical filter, comprising steps of:

changing values of said control signal to change the selecting wavelength of said optical filter thereby within a wavelength range comprising wavelengths of light of first and second wavelengths generated by optical frequency modulation;

detecting a difference between a first value, which is a value of said control signal when said optical filter selects said light of the first wavelength, and a second value, which is a value of said control signal when said optical filter selects said light of the second wavelength; and as letting a third value be a value of the control signal when said optical filter selects a third wavelength and a fourth value be a value of the control signal when said optical filter selects a four wavelength, correcting, based on the difference between said first value and said second value, the relation between a wavelength difference between said third wavelength and said fourth wavelength and a difference between said third value and said fourth value.

24. The method according to claim 23, wherein said third or fourth wave length is equal to or close to said first wavelength or said third or fourth wavelength is equal to or close to said second wavelength.

\* \* \* \* \*

UNITED STATES PATENT AND TRADEMARK OFFICE
CERTIFICATE OF CORRECTION

PATENT NO. : 5,774,243
DATED : June 30, 1998
INVENTOR(S) : MASAO MAJIMA

It is certified that error appears in the above-identified patent and that said Letters Patent is hereby corrected as shown below:

TITLE PAGE AT ITEM [54] TITLE:
"CONTROL METHOD OF SELECTING WAVELENGTH OF OPTICAL FILTER, WAVELENGTH CONTROL METHOD OF OUTPUT LIGHT FROM LIGHT OUTPUTTING APPARATUS, WAVELENGTH DIVISION MULTIPLEXING METHOD IN OPTICAL COMMUNICATION SYSTEM AND METHOD FOR CORRECTING RELATION BETWEEN CONTROL" should read --CONTROL METHOD OF SELECTING WAVELENGTH OF OPTICAL FILTER, WDM SYSTEM AND METHOD FOR CORRECTING RELATION BETWEEN CONTROL SIGNAL AND SELECTING WAVELENGTH OF FILTER --.

Signed and Sealed this

Twenty-eighth Day of December, 1999

Attest:

*Attesting Officer*

Q. TODD DICKINSON

*Acting Commissioner of Patents and Trademarks*